Figures 1, 2:
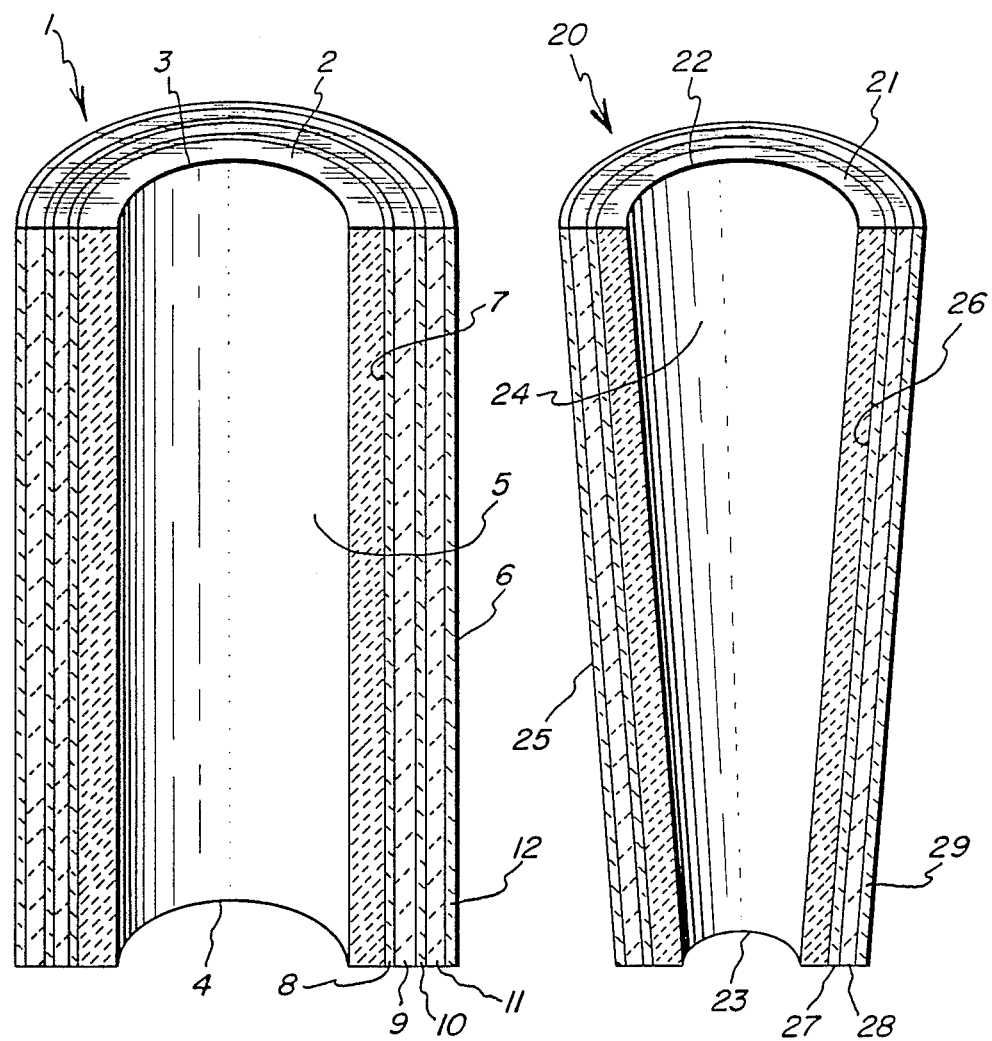

United States Patent [19]

Svec et al.

[11] Patent Number: 4,966,201
[45] Date of Patent: Oct. 30, 1990

[54] TRANSFER TUBE

[75] Inventors: Paul S. Svec, Scotia; Marcus P. Borom, Schenectady; Lawrence E. Szala, Scotia; Milivoj K. Brun, Ballston Lake; Steven A. Miller, Amsterdam, all of N.Y.; David P. Mourer, Danvers, Mass.

[73] Assignee: General Electric Company, Schenectady, N.Y.

[21] Appl. No.: 367,411

[22] Filed: Jun. 16, 1989

[51] Int. Cl.⁵ .............................. F16L 9/14; F16L 9/10
[52] U.S. Cl. .................................... 138/141; 428/34.4; 428/34.6; 138/140; 138/145; 138/149; 222/591; 266/225
[58] Field of Search ............... 138/141, 140, 172, 177, 138/149, 145; 222/591; 266/225; 428/34.6; 432/233, 235

[56] References Cited

U.S. PATENT DOCUMENTS

| | | | |
|---|---|---|---|
| 3,955,616 | 5/1976 | Gigliotti, Jr. et al. | 164/361 |
| 3,972,376 | 8/1976 | Price | 173/139 |
| 4,024,300 | 5/1977 | Svec | 427/202 |
| 4,128,431 | 12/1978 | Svec | 106/38.35 |
| 4,131,475 | 12/1978 | Svec | 106/38.3 |
| 4,187,266 | 2/1980 | Greskovich | 264/43 |
| 4,188,450 | 2/1980 | Greskovich | 428/329 |
| 4,247,333 | 1/1981 | Ledder et al. | 106/38.9 |
| 4,296,921 | 10/1981 | Heyashi | 138/172 |
| 4,396,824 | 8/1983 | Fiegl et al. | 138/140 |
| 4,744,842 | 5/1988 | Webster et al. | 138/149 |

Primary Examiner—Harvey C. Hornsby
Assistant Examiner—G. Graham
Attorney, Agent, or Firm—Jane M. Binkowski; James C. Davis, Jr.; James Magee, Jr.

[57] ABSTRACT

A transfer tube is produced comprised of a high density ceramic oxide tube having a low density multi-layered ceramic oxide shell directly bonded to its outer surface wall.

17 Claims, 1 Drawing Sheet

TRANSFER TUBE

This application is related to U.S. Ser. No. (RD-19,268), filed on or about Apr. 17, 1989, for TRANSFER TUBE, for Borom et al., which is assigned to the assignee hereof and incorporated herein by reference.

Related U.S. Pat. Nos. 4,024,300; 4,128,431; 4,131,475 all to Paul S. Svec; and 4,247,333 to Ledder et al.; all are assigned to the assignee hereof and are incorporated herein by reference.

This invention relates to the production of a transfer tube comprised of a high density ceramic oxide tube having directly bonded to its outer surface wall a low density sintered ceramic oxide covering.

In the past, because of their chemical inertness and resistance to thermal shock, low density tubes of alumina and zirconia have been used to transfer molten metal. One disadvantage of the low density tubes is that they are mechanically weak and fragments, which are very deleterious to the properties of the bulk metal, crack off and enter the passing stream of molten metal. Frequently, the low density tubes break up. Also, the low density tubes have rough surfaces which provide very high specific surface areas where oxides and slag can adhere and ultimately block the orifices. On the other hand, high density tubes are not useful because of their poor thermal shock resistance.

The present invention overcomes the disadvantages of the prior art by providing an integral transfer tube comprised of a high density ceramic oxide tube with its outer surface wall preferably enveloped by low density ceramic oxide material. The low density material has a thermal conductivity sufficiently lower than that of the high density tube to prevent build-up of thermal stresses therein that would have a significantly deleterious effect on the high density tube. Also, the high density tube in the present transfer tube provides a smooth, or substantially smooth, surface thereby eliminating or significantly reducing adherence of oxide or slag.

Those skilled in the art will gain a further and better understanding of the present invention from the detailed description set forth below, considered in conjunction with the figures accompanying and forming a part of the specification in which:

FIG. 1 illustrates a cross-sectional view of one embodiment of the present transfer tube; and FIG. 2 shows a cross-sectional view of another embodiment of the present transfer tube.

Briefly stated, the present transfer tube is comprised of a hollow high density tube having directly bonded only to its outer surface wall, leaving no significant portion thereof exposed, a single continuous low density shell, said high density tube being comprised of polycrystalline ceramic oxide with a density of at least about 90% of its theoretical density, said high density tube having a passageway extending through its length with a cross-sectional area at least sufficient for transfer of molten metal therethrough, at least about 75 weight % of said shell being comprised of polycrystalline ceramic oxide, said shell being comprised of a plurality of sequential layers directly bonded to each other, said sequential layers being comprised of at least two primary layers and at least one intermediate secondary layer disposed between said primary layers, the ceramic oxide grains in said primary layers having an average size which is significantly smaller than the average size of the ceramic oxide grains in said intermediate secondary layer, said low density shell ranging in density from about 40% to about 80% of its theoretical density, said low density shell having a thermal expansion coefficient within about ±25% of the thermal expansion coefficient of said high density tube.

The term "metal" herein includes metal alloys, particularly superalloys.

FIG. 1 shows transfer tube 1 containing high density ceramic oxide tube 2 which is open at both its upper end portion 3, i.e. the entrance end for the molten metal, and its lower end portion 4, i.e. the exit end for the molten metal. Passageway 5 extends through tube 2, and in this embodiment, passageway 5 has the same circular cross-sectional area throughout its length. Low density ceramic oxide shell 6 is directly bonded to the outer surface wall 7 of high density tube 2. Shell 6 is comprised of primary layers 8, 10 and 12 and intermediate secondary layers 9 and 11. FIG. 1 shows that all of the layers in the shell are concentric and are directly bonded to each other. Primary layer 8 is also directly bonded to outer surface wall 7 of high density tube 2.

FIG. 2 shows transfer tube 20 containing high density ceramic oxide tube 21 which is open at both its upper end portion 22 through which the molten metal enters the tube, and its lower end portion 23 through which the molten metal exits the tube. Passageway 24 extends through tube 21, and in this embodiment, passageway 24 decreases in circular cross-sectional area from upper end portion 22 to lower end portion 23. Low density ceramic oxide shell 25 is directly bonded to the outer surface wall 26 of high density tube 21. In this embodiment, shell 25 is comprised of primary layers 27 and 29 and intermediate secondary layer 28.

In the present transfer tube, the high density tube is a hollow body with two open ends, i.e. an entrance end and an exit end. It has a passageway extending throughout its length, i.e. through both open ends. The cross-sectional area of the passageway is at least sufficient to permit the passage of a molten metal downwardly therethrough. The particular cross-sectional area of the passageway depends largely on the particular application of the transfer tube and is determined empirically. Generally, the cross-sectional area of the passageway ranges from about 0.8 to about 5000 square millimeters, frequently from about 3 to about 1500 square millimeters or from about 7 to about 1000 square millimeters. The cross-sectional area can be the same, or it can vary, through the length of the passageway.

The high density tube, as well as the passageway extending therethrough, can be in any desired shape. For example, the cross-sectional area of the passageway can be in the shape of a circle, a square, an oval, a rectangle, a star, and any combination thereof. The outer wall of the high density tube can be flat but preferably it is curved. For example, the high density tube can be in the form of a cylinder, rectangle, or a square. Preferably, the high density tube, including its passageway, is cylindrical in shape.

The high density tube has a minimum wall thickness which depends largely on the application of the transfer tube and is determined empirically. Generally, the high density tube has at least a wall thickness which is sufficient to maintain, or substantially maintain, its integrity in the transfer tube when molten metal is passed therethrough. Generally, the wall thickness of the high density tube ranges from about 0.125 millimeters to less than about 6.5 millimeters, frequently from about 0.250 millimeters to about 2 millimeters, or from about 0.700 millimeters to about 1.500 millimeters. Generally, a high density tube with a wall thickness greater than about 6.5 millimeters provides no advantage.

The high density tube has a length which can vary widely depending largely on the application of the transfer tube and is determined empirically. It has a length at least sufficient for transfer of molten metal therethrough. It can be as long as desired. Generally, its length ranges from about 15 millimeters to about 1000 millimeters, and frequently, it ranges from about 25 millimeters to about 200 millimeters. For example, when the transfer tube is used as an orifice, its length generally ranges from about 25 millimeters to about 100 millimeters.

Generally, the high density tube ranges in density from about 90% to about 100%, preferably from about 95% to about 100%, of its theoretical density. The particular density depends largely on the particular application of the transfer tube and is determined empirically. Preferably, porosity in the high density tube is non-interconnecting.

The average grain size of the high density tube may vary depending largely on the particular application of the transfer tube and is determined empirically. Preferably, the average grain size of the high density tube is sufficiently small to prevent cracking off, or significant cracking off, of fragments of the tube when contacted by passing molten metal at the particular temperatures used. Generally, the average grain size of the high density tube ranges from about 5 microns to about 50 microns, or from about 10 microns to about 40 microns, or from about 20 microns to about 30 microns.

The chemical composition of the high density ceramic oxide tube depends largely on the particular application of the transfer tube and is determined empirically. The high density tube is comprised of polycrystalline ceramic oxide material which is chemically inert, or substantially chemically inert, with respect to the molten material to be passed therethrough. Specifically, it should have no significant deleterious effect on the molten metal passed therethrough.

Preferably, the high density tube is comprised of a ceramic oxide material selected from the group consisting of alumina, beryllia, magnesia, magnesium aluminate, mullite, yttria, zirconia, and mixtures thereof. Generally, zirconia is known in the art as stabilized zirconia which generally is comprised of the cubic structure, or a combination of cubic, monoclinic and tetragonal structures.

The high density tube may be available commercially. It also can be produced by a number of conventional techniques known in the ceramics art. In a preferred technique, sinterable ceramic oxide particulate material is shaped into the desired form of hollow tube having dimensions which on densification will produce the desired high density tube and is sintered in a gaseous atmosphere or a partial vacuum at a temperature at which it will densify to the desired density. Particle size of the sinterable material is determinable empirically and depends largely on the grain size desired in the high density tube. Generally, the sinterable material has an average particle size of less than 5 microns. Also, the sinterable particulate material can vary widely in composition depending largely on the particular high density tube desired. For example, it may be comprised of ceramic oxide powder alone, or of a mixture of the ceramic oxide powder and a sufficient amount of a sintering agent therefor determined empirically. The sinterable zirconia material would include a stabilizing agent therefor in an effective amount as is well-known in the art to produce generally the cubic structure, or a combination of cubic, monoclinic and tetragonal structures. In a specific example, alumina powder having an average particle size of about 4 microns can be shaped into a tube and sintered in argon at about atmospheric pressure at about 1700° C. to produce the present high density tube.

The high density tube has a thermal expansion coefficient which depends largely on the particular transfer tube desired and its application and is determined empirically. Generally, the high density tube has a thermal expansion coefficient greater than about $40 \times 10^{-7}/°$ C., frequently greater than about $65 \times 10^{-7}/°$ C., and more frequently it is about $90 \times 10^{-7}/°$ C.

In the present transfer tube, the high density tube is surrounded by the low density shell. Generally, the low density shell has a thermal expansion coefficient which is within $\pm 25\%$, preferably within $\pm 10\%$, or within $\pm 5\%$, of that of the high density tube. Most preferably, the low density shell has a thermal expansion coefficient which is the same as, or not significantly different from, that of the high density tube.

The low density shell has a thermal conductivity which is always significantly lower than that of the high density tube and which depends largely on the application of the resulting transfer tube. The shell has a thermal conductivity, determined empirically, which is sufficiently low to prevent formation of a significantly deleterious high thermal gradient through the wall of the high density tube. Generally, the present shell prevents cracking off, or significant cracking off, of fragments of the high density tube into the passing molten metal. The shell, through its low thermal conductivity and direct bonding to the high density tube, physically reduces the thermal gradients through the wall of the high density tube sufficiently for the present transfer tube to be useful for transfer of molten metal. The direct bonding of the shell to the high density tube facilitates constraint of the high density tube and transfer of beneficial, biaxial compressive stresses to the high density tube. Thermal gradients which would be significantly deleterious to the high density tube have no significant deleterious effect on the low density shell because of its lower elastic modulus and higher toughness. Generally, the thermal conductivity of the shell ranges from about 10% to about 90% lower, or from about 20% to about 50% lower, than that of the high density tube.

The low density shell has a density which depends largely on the particular application of the transfer tube and is determined empirically. Generally, for a low density shell of given chemical composition, the larger its volume of pores, the lower is its thermal conductivity. Generally, the low density shell has a density ranging from about 40% to about 80%, frequently from about 50% to about 70%, or from about 60% to about 65%, of its theoretical density. Porosity in the low density shell is interconnecting.

The low density shell is comprised of sequential layers which are directly bonded to each other. The shell is comprised of at least three layers, i.e. at least two primary layers and at least one intermediate secondary layer disposed between the two primary layers. The particular number of layers in the shell depends largely on the particular application of the transfer tube and is determined empirically. The shell can contain a plurality of intermediate secondary layers, i.e. as many as desired, provided each intermediate secondary layer is disposed between two primary layers. Generally, the layers in a shell are of the same, or are of substantially the same, length. Generally, none, or no significant portion, of the wall of an intermediate secondary layer is exposed, i.e. it is covered, or substantially covered, by a primary layer.

The grain size of the polycrystalline phase of the low density shell can vary depending largely on the particular shell desired and is determined empirically. Generally, the grains in the primary layers of the shell have an average size which is significantly smaller, generally at least about 20% smaller, than the average size of the grains in the intermediate secondary layers.

Generally, the grains in the primary layers of the shell have an average size ranging from about 15 microns to about 50 microns, frequently ranging in average size from about 20 microns to about 37 microns. In one embodiment, alumina grains in the primary layers are substantially platelike or tabular in form.

Generally, the grains in the intermediate secondary layers of the shell have an average size ranging from about 150 microns to about 430 microns, frequently ranging in average size from about 200 microns to about 400 microns. In one embodiment, alumina grains in the intermediate secondary layers are non-plate-like or non-tabular in form.

The layers in the sintered shell can range in thickness depending largely on the particular transfer tube desired. Also, the layers in a shell may differ in thickness from each other. In one embodiment, all of the primary layers in a shell are of substantially the same thickness. In one embodiment, a primary layer ranges in thickness from about 455 microns to about 765 microns. In one embodiment, all of the intermediate secondary layers in a shell are of substantially the same thickness. In one embodiment, an intermediate secondary layer ranges in thickness from about 505 microns to about 890 microns.

The grains in a primary layer of a shell may or may not be present substantially as a layer only about one grain thick.

Frequently, the grains in an intermediate secondary layer of the sintered shell are present substantially as a layer of one grain thickness.

In one embodiment, each layer in a shell is of a uniform, or substantially uniform, thickness.

In another embodiment, a layer or layers in the shell have a thickness which is non-uniform, substantially uniform or a combination thereof.

The low density shell of the present transfer tube has a minimum total wall thickness which depends largely on the particular application of the transfer tube and is determined empirically. Its minimum total wall thickness should be sufficient to prevent a deleterious effect, or significant deleterious effect, on the high density tube when molten metal is passed therethrough. Generally, the minimum total wall thickness of the shell is about 1 millimeter. The maximum total wall thickness of the low density shell can be as large as desired. Generally, the total wall thickness of the low density shell ranges from about 1 millimeter to about 100 millimeters, or from about 2 millimeters to about 50 millimeters, or from about 3 millimeters to about 10 millimeters.

The low density shell is an integral body. Generally, it covers the outer surface wall of the high density tube leaving no significant portion thereof exposed. For example, if desired, an end portion or both end portions of the high density tube may be left exposed in the resulting transfer tube if necessary to fit it into a particular device. Preferably, the low density shell leaves none, or substantially none, of the outer surface wall of the high density tube exposed.

The low density shell is comprised of ceramic oxide material whose composition can vary depending largely on the particular application of the transfer tube and is determined empirically. Frequently, the shell is comprised of polycrystalline ceramic oxide phase and an amorphous glassy phase. In one embodiment, the shell is comprised of a polycrystalline ceramic oxide phase. Generally, the polycrystalline ceramic oxide phase comprises from about 75 weight % to about 100 weight %, or from about 90 weight % to about 99 weight %, or from about 93 weight % to about 96 weight %, of the shell. Generally, more than 50 weight %, or at least about 75 weight %, or at least about 90 weight %, of each layer of the shell is comprised of polycrystalline ceramic oxide phase.

Preferably, the polycrystalline ceramic oxide phase in the low density shell is comprised of a ceramic oxide selected from the group consisting of alumina, berrylia, magnesia, magnesium aluminate, mullite, yttria, zirconia and mixtures thereof. The zirconia is stabilized zirconia generally comprised of the cubic structure, or a combination of the cubic, monoclinic and tetragonal structures.

The present process for producing a transfer tube comprised of a high density tube having directly bonded to its outer surface wall a continuous multi-layered shell with a maximum density of about 80% of theoretical and wherein at least about 75 weight % of said shell is comprised of polycrystalline phase, comprises the following steps:

(a) providing a high density polycrystalline hollow tube comprised of ceramic oxide, said high density tube having two open ends and a density of at least about 90% of its theoretical density;

(b) forming an alkaline aqueous slurry having a solids content ranging from about 45% to about 60% by volume of the total volume of said slurry, said solids content being comprised of particles of slurry-forming size of ceramic oxide, solid polymer which thermally decomposes at an elevated temperature below 800° C. and colloidal silica, said ceramic oxide ranging from about 93% to about 96% by weight of said solids content, said polymer ranging from zero to about 2% by weight of said solids content, and said colloidal silica ranging from about 3% to about 6% by weight of said solids content, said slurry having a pH ranging from about 9 to 12, said slurry having a specific gravity at about 20° C. ranging from about 2.2 g/cc to about 2.7 g/cc and a viscosity at about 20° C. ranging from about 9 to about 15 seconds as measured with a No. 4 Zahn cup;

(c) plugging both open ends of said high density tube with solid polymeric material which thermally decomposes at an elevated temperature below about 800° C.;

(d) immersing said plugged tube into said slurry;

(e) recovering said tube from said slurry forming a wet coating of slurry on the exposed outer surface wall of said tube leaving no significant portion thereof exposed;

(f) contacting the resulting wet coated tube with coarse ceramic oxide particles to form a coating thereof on said wet coating of slurry leaving no significant portion thereof exposed, said coarse ceramic oxide particles being of a size which forms said coating thereof on said wet coating of slurry, the average size of said coarse ceramic oxide particles being significantly larger than the average size of the ceramic oxide particles in said slurry, said ceramic oxide particles permitting production of said polycrystalline phase;

(g) drying the resulting coated tube to permit said silica particles to combine with water to produce a dimensionally stable silica gel which binds the ceramic oxide particles;

(h) immersing the resulting dry coated tube into said slurry to coat said tube;

(i) recovering the coated tube from said slurry forming a wet coating of slurry on the coating of coarse ceramic oxide particles leaving no significant portion of said coating of coarse ceramic oxide particles exposed, said coarse ceramic oxide particles being of a size which enables formation of said wet coating of slurry thereon;

(j) drying the resulting coated tube to permit said silica particles to combine with water to produce a dimensionally stable silica gel, said silica gel thermally decomposing at an elevated temperature to silica;

(k) firing the resulting coated tube to produce said transfer tube, said firing being carried out in an atmosphere or a partial vacuum which has no significant deleterious effect thereon; and (l) before or after step (k) providing said high density tube with ends free of any shell material.

In carrying out the present process, an aqueous alkaline slurry or dispersion is formed which preferably is uniform or substantially uniform and which is useful for producing the primary layers of the sintered shell. Generally, the present slurry is stable or substantially stable, i.e. it maintains its dispersed state, when its pH ranges from about 9 to about 12, preferably from about 10 to about 11, and most preferably its pH is about 10.

Generally, the components used in forming the slurry are known in the art or are commercially available and the slurry can be formed in a conventional manner. The materials used in forming the slurry should have no significant deleterious effect on each other or on the resulting transfer tube.

Generally, the solids content of the slurry is comprised of particles of ceramic oxide, polymer, and colloidal silica. Generally, the solids content of the slurry ranges, by volume % of the total slurry, from about 45% to about 60%, preferably from about 49% to about 54%, more preferably about 52%. Generally, the ceramic oxide particles range by weight of the total solids, i.e. solids content, of the slurry from about 93% to about 96%, preferably about 95%. Generally, the polymer particles range from zero to about 2%, or up to about 2%, frequently from about 0.5% to about 2%, preferably about 1%, by weight of the total solids, i.e. solids content, of the slurry. Generally, the colloidal silica particles range from about 3% to about 6%, preferably about 4%, by weight of the total solids, i.e. solids content, of the slurry. The particular composition of the solids content is determined empirically depending on such factors as the desired composition of the first layers in the shell component of the transfer tube.

The slurry has a combination of specific gravity and viscosity determined empirically which enables the deposition of a coating useful for forming the primary layers of the sintered shell component of the transfer tube. Generally, the slurry has a specific gravity at about 20° C. ranging from about 2.2 to about 2.7 g/cc, preferably from about 2.4 to about 2.5 g/cc. Also, generally, the slurry has a viscosity at about 20° C. as measured by a No. 4 Zahn cup ranging from about 9 to about 15 seconds, preferably ranging from about 10 to about 13 seconds.

The ceramic oxide powder used in forming the slurry is of a slurry- or dispersion-forming size useful for depositing the slurry coating. Generally, the ceramic oxide particles in the slurry have a U.S. sieve mesh size of about −200 mesh, preferably about −325 mesh. Generally, the ceramic oxide particles in the slurry have an average particle size ranging from about 15 to about 50 microns, frequently having an average particle size ranging from about 20 microns to about 37 microns. The particular ceramic oxide particle size is determined empirically depending to some extent on the particular average grain size desired in the polycrystalline phase of the primary layers of the sintered shell. In one embodiment, the alumina particles in the slurry are platelike or tabular in form.

The slurry may or may not contain the polymer particles depending largely on the thickness of the slurry coating to be deposited and the uniformity desired in the deposited coating. Whether the polymer particles are required, and the amount thereof, can be determined empirically. Generally, the polymer particles promote uniformity in a coating, and generally they are required for producing thin coatings which are substantially uniform. For thick slurry coatings, generally for coatings thicker than about 700 microns, the polymer particles generally are not necessary.

The polymer particles in the slurry are comprised of solid organic polymer which thermally decomposes essentially completely at an elevated temperature below 800° C., frequently decomposing at a temperature ranging from above 50° C. to below 500° C. Generally, on decomposition, part of the polymer vaporizes away and part is left as elemental carbon. Representative of a useful polymer is a copolymer of butadiene-styrene.

The polymer particles are submicron in size and are of a size which can be dispersed in water, i.e. they are of a latex-forming size. Generally, the polymer particles have a size of less than about 10,000 Angstroms(Å), frequently ranging in size from about 1000 Å to about 3000 Å, or about 2000 Å. Generally, an aqueous alkaline dispersion of the polymer particles, i.e. a latex, is used in forming the slurry, preferably having a pH of about 10. Preferably, the polymer particles comprise from about 40% to about 55%, or about 48%, by weight of the latex. Such latexes are commercially available.

Generally, an aqueous alkaline dispersion of colloidal silica is used in forming the slurry. Generally, the silica particles comprise from about 10% to about 20%, preferably about 15%, by weight of the colloidal silica dispersion. Generally, the silica particles have an average size of less than about 15 microns, frequently ranging in average size from submicron to about 10 microns.

Commercially available aqueous colloidal silica dispersions can be used. The solids content of these commercially available dispersions can be adjusted in a conventional manner, frequently adding water thereto, to produce a dispersion of desired silica solids content. Generally, the aqueous colloidal silica dispersion is formed with the addition of a base such as sodium hydroxide, preferably producing a silica dispersion with a pH of about 10.

The present slurry can be prepared in a conventional manner by stirring the components together, preferably in air at about atmospheric pressure and at about room temperature. Room temperature herein ranges from about 15° C. to about 25° C. A conventional mixing vessel frequently of stainless steel construction can be used. The components should be mixed until the viscosity of the slurry becomes stabilized or substantially stabilized. Preferably, about 90% of the ceramic oxide particles is added to a mixture of the aqueous colloidal silica dispersion and latex, mixed together for about 2 hours, and the remainder of the ceramic oxide particles added to the resulting mixture. Mixing is then continued until the slurry has the desired stable viscosity, which frequently requires about 5 hours.

Generally, a wetting agent is added to the slurry to promote wetting and deposition of a coating of desired uniformity. Conventional wetting agents, preferably nonionic, can be used. The wetting agent is used in an effective amount determined empirically, i.e. a predetermined amount. Generally, from about 1.2 ml to about 7.2 ml of wetting agent per liter of slurry is sufficient.

Also, a defoaming agent may or may not be added to the slurry depending on whether excessive foam forms during the mixing operation. If good slurry mixing practices are followed, foaming will not be a problem. For example, use of a defoaming agent can be avoided by mixing the slurry slowly overnight. However, a conventional defoaming agent can be used, such as, for example, a silicone emulsion sold under the trademark Antifoam 60. The defoaming agent is used in an effective amount determined empirically, i.e. a predetermined amount. Generally, the defoaming agent ranges by weight of the total slurry from about 0.003% to about 0.008%.

Preferably, the wetting and defoaming agents are admixed with the slurry to distribute them substantially uniformly therein. The wetting and defoaming agents should have no significant deleterious effect on the slurry, i.e. they should be compatible with the other components of the slurry.

During stirring, the specific gravity of the slurry can be checked and adjusted to produce the desired specific gravity. If the specific gravity is too low, ceramic oxide particles can be added thereto to increase it. If the specific gravity is too high, generally colloidal silica dispersion is added to lower it.

The viscosity of the slurry can also be adjusted during mixing to produce the desired viscosity. Adjustments can be made in the same manner as that employed in adjusting the specific gravity of the slurry.

In a preferred embodiment, the slurry has a pH of about 10.2, a specific gravity of about 2.46 g/cc at about 20° C. and a viscosity at about 20° C. of about 11 seconds as measured by a No. 4 Zahn cup, and is produced by admixing about 76 to about 78 weight % of ceramic oxide, preferably alumina, particles of −325 U.S. mesh size having an average particle size of about 37 microns, about 2 weight % of latex with a polymer solids content of about 48% by weight of the latex and wherein the size of the polymer particles is about 2000 Angstroms, and from about 20 to about 22 weight % of an aqueous colloidal silica dispersion wherein the silica particles comprise about 15% by weight of the colloidal silica dispersion.

In one embodiment of the present process, the outer surface wall of the high density ceramic oxide tube is abraded to roughen it to promote or enable adherence of the first slurry coating to the wall. Such abrading should have no significant deleterious effect on the high density tube and can be carried out by a number of conventional techniques. For example, the outer surface wall of the high density tube can be sand blasted by means of a dental blaster, preferably with a powder of the same ceramic oxide of which the tube is made. This roughening of the outer surface wall provides a mechanical lock with the slurry deposited thereon thereby aiding formation of a uniform or substantially uniform slurry coating.

Preferably, the high density tube is then cleaned to remove any deleterious matter thereon and such cleaning can be carried out in a conventional manner. For example, the tube can be immersed in a conventional vapor degreaser containing trichloroethylene.

Both open ends of the high density tube are plugged to prevent coating of the interior of the tube. Generally, the plugs are comprised of an organic polymeric material which thermally decomposes essentially completely at an elevated temperature below 800° C., frequently decomposing at a temperature ranging from above 50° C. to below 500° C. Generally, on decomposition, part of the polymeric material vaporizes away and part is left as elemental carbon. Preferably, the polymeric material is a solid wax which melts at a temperature ranging from about 70° C. to about 100° C. thereby enabling its removal by melting it away. Generally, the plugs are formed of polymeric material which is commercially available.

Any means which has no significant deleterious effect on the present process can be used to facilitate dipping of the tube in the slurry. For example, a handle can be attached to one end, or one end portion, of the high density tube. In another example, one end portion of a bar of plug material can encapsulate one end portion of the high density tube and a hook can be inserted in the opposite end portion of the bar of plug material.

Generally, the coating procedure is carried out at room temperature in air at about atmospheric pressure. The plugged tube is immersed in the slurry to coat the tube and withdrawn therefrom to produce preferably a uniform or substantially uniform slurry coating leaving none, or no significant portion, of the outer surface wall of the tube exposed. Specifically, a slurry coating is deposited on the exposed outer surface wall of the high density tube leaving none, or no significant portion, of the exposed outer surface wall exposed. Generally, on withdrawing the tube from the slurry, it is manipulated, generally held horizontally and rotated on its longitudinal axis, to drain away excess slurry. The polymer particles in the slurry aid in the formation of a continuous, preferably uniform or substantially uniform, slurry coating.

The resulting wet coated tube is placed in contact with coarse ceramic oxide particles to deposit a layer or coating thereof on the wet slurry coating leaving none, or no significant portion, of the wet coating exposed.

The coarse ceramic oxide particles are of a size which enables formation of a layer or coating thereof on the wet slurry coating. The coating of coarse ceramic oxide particles permits the production of intermediate secondary layers in the sintered shell. Generally, the coarse ceramic oxide particles have an average particle size ranging from about 150 microns to about 430 microns, frequently ranging in average particle size from about 200 microns to about 400 microns. The size or average size of the coarse ceramic oxide powder can vary and is determined empirically depending largely on the particular sintered shell desired, i.e. the particular intermediate secondary layer or layers desired in the sintered shell.

The deposition of the coarse ceramic oxide particles can be carried out by a number of conventional techniques, such as, for example, hand sprinkling, immersion in a fluid bed or insertion in a sand rain machine. Generally, substantially only a single layer of the coarse ceramic oxide particles is deposited.

The resulting coated tube is then dried to permit the silica particles to combine with water in the coating to form a silica gel which is generally an inflexible, dimensionally stable solid at room temperature. Preferably, drying is carried out at about room temperature in air at about atmospheric pressure. Drying time is determined empirically and frequently requires about an hour. The dimensionally stable silica gel acts as a binder for the ceramic oxide particles providing sufficient mechanical strength for further slurry deposition.

The dry coated tube is then immersed in the slurry and withdrawn therefrom to produce, preferably a uniform or substantially uniform,, slurry coating on the coating of coarse ceramic oxide particles leaving none, or no significant portion, of the coarse ceramic oxide particles exposed. The coating of coarse ceramic oxide particles, i.e. the size of the coarse ceramic oxide particles, provides a mechanical lock for the deposited slurry thereby enabling the formation of a continuous, preferably uniform or substantially uniform, slurry coating.

The procedure of depositing a coating of coarse ceramic oxide particles, drying to form the silica gel binder, and depositing a wet coating of slurry on the coating of coarse ceramic oxide particles can be repeated as many times as desired. When the last slurry coating is deposited on the last coating of coarse ceramic oxide particles, the wet coated tube is dried to permit formation of the dimensionally stable silica gel binder.

The shell-forming ceramic oxide particles can vary widely in composition depending largely on the particular low density shell desired. Generally, the shell-forming ceramic oxide particles are of a composition which produces polycrystalline ceramic oxide phase in the present transfer tube. The shell-forming ceramic oxide particles should produce a polycrystalline phase in the shell which comprises at least about 75 weight %, or at least about 90 weight %, or at least about 93 weight %, of the shell. The shell-forming ceramic oxide particles should be of a composition which produces the desired shell directly bonded to the outer surface wall of the high density tube. Preferably, the shell-forming ceramic oxide particles are comprised of alumina.

If desired, any coating material adhering to the surfaces of both ends of the high density tube can be removed before firing. Such removal can be carried out in a conventional manner such as by filing or sanding off the material. Although the plugs can be melted away, or thermally decomposed away, during firing, it is preferable at this time to remove most of the plugs in a conventional manner. For example, coating material can be filed off the plugs and most of each plug can be removed by contacting it with a hot soldering tool. The remainder of each plug is eliminated during firing.

The coated tube is fired to produce the desired sintered shell directly bonded to the outer surface wall of the high density tube. Specifically, firing is carried out to dehydrate the silica gel, to thermally decompose organic polymer and to remove any resulting elemental carbon, and to produce the present sintered shell directly bonded to the outer surface wall of the high density tube. Firing can be carried out in a single step or in more than one step. Firing is carried out in an atmosphere which has no significant deleterious effect on the present process or on the resulting transfer tube.

Generally, firing is carried out at about atmospheric pressure. However, if desired, firing can be carried out in a partial vacuum which generally may range from below atmospheric pressure to about 0.1 torr. Initially, the firing atmosphere or partial vacuum is oxidizing at least until elemental carbon resulting from thermal decomposition of polymer is removed leaving no significant amount thereof.

The silica gel thermally decomposes to silica at an elevated temperature generally ranging to about 1000° C. Generally, at an elevated temperature below 500° C. water is lost from the silica gel, and frequently at a firing temperature ranging from about 700° C. to about 1000° C., the silica gel thermally decomposes to silica.

At an elevated temperature below 800° C., and generally at a firing temperature ranging from above 50° C. to below 500° C., the organic polymer in the coatings thermally decomposes producing some elemental carbon, and in the same temperature range any organic polymeric plug material melts away or thermally decomposes possibly leaving some elemental carbon. The firing atmosphere is maintained sufficiently oxidizing until thermal decomposition of the organic material is complete and the resulting elemental carbon has combined with the atmosphere to form a gas, generally carbon monoxide or carbon dioxide, which effuses away thereby removing all or substantially all of the elemental carbon. Representative useful oxidizing atmospheres are air; a mixture of a noble gas such as argon or helium and air or oxygen; and a mixture of natural gas and air. Generally, removal of polymer particles from the coatings leaves additional pores in the shell-forming layers.

After thermal decomposition of the polymer and removal of the resulting elemental carbon, and decomposition of the silica gel, the resulting specimen is comprised of the high density tube with porous layers of shell-forming material generally comprised of the present ceramic oxide and silica. The specimen is then sintered to produce the present transfer tube. Generally, the sintering or firing temperature ranges from about 1000° C. to about 1900° C., preferably ranging from about 1600° C. to about 1850° C., to produce the present transfer tube. Generally, sintering is completed in less than one or two hours. In a preferred embodiment, the specimen is sintered, generally at a low sintering temperature of about 1000° C., and the resulting transfer tube is additionally sintered or fired, at a higher temperature, for example at about 1700° C., to produce a transfer tube with desired characteristics such as a shell which is dimensionally stable to at least 1700° C.

The particular firing or sintering temperature used to produce the present transfer tube is determined empirically and depends on such factors as the particular composition being fired or sintered, the particular composition desired in the sintered shell, and the particular dimensional stability desired at the temperature of use. At the sintering temperature, the present shell-forming material undergoes bonding and usually some shrinkage to form the sintered shell. The particular amount of shrinkage depends largely on both the sintering temperature and the particular composition being sintered and is determined empirically. As an example, the sintered shell of a transfer tube produced at about 1000° C. is dimensionally stable at 1000° C. but frequently undergoes some additional shrinkage at a temperature higher than 1000° C. Generally, shrinkage of the shell-forming material in forming the present shell is less than about 10% by volume. Generally, shrinkage occurs radially and there is no significant longitudinal shrinkage.

After removal of elemental carbon, i.e. upon production of a structure free of elemental carbon, the firing or sintering atmosphere can be any atmosphere which has no significant deleterious effect on the resulting transfer tube. The firing or sintering atmosphere may be reducing or substantially inert with respect to the materials being fired or sintered. Representative of useful firing or sintering atmospheres for the structure free of elemental carbon is argon, helium, air, hydrogen and mixtures thereof.

The particular firing or sintering temperature and the particular firing or sintering atmosphere used may have a significant effect on the particular composition of the sintered shell and is determined empirically.

Generally, for example with respect to alumina, when firing or sintering is carried out at a temperature ranging from about 1000° C. to about 1700° C. in a non-reducing atmosphere, a sintered shell comprised of polycrystalline alumina and an amorphous phase, generally an aluminosilicate, is produced. Generally, when firing or sintering is carried out in a non-reducing atmosphere at a temperature ranging from above 1700° C. to about 1900° C., a sintered shell comprised of polycrystalline alumina, mullite, and an amorphous alumino-silicate is produced, or a sintered shell comprised of polycrystalline alumina and mullite is produced. Generally, with increasing temperature and decreasing alumina particle size, mullite formation increases.

On the other hand, when firing or sintering is carried out in a reducing atmosphere, silica is reduced in amount or eliminated. Therefore, a sintered shell comprised of polycrystalline ceramic oxide, for example alumina, may be produced by carrying out firing or sintering in a reducing atmosphere.

The resulting fired or sintered structure, i.e. the present transfer tube, is cooled at a rate which has no significant deleterious effect thereon, i.e. cooling should be carried out at a rate which prevents cracking of the transfer tube. The transfer tube may be furnace cooled. Generally, it is cooled in the same atmosphere or vacuum in which firing or sintering was carried out. Generally, it is cooled to about room temperature, i.e. from about 20° C. to about 30° C.

If any shell material is adhered to an end, i.e. an end surface, of the high density tube, it can be removed in a conventional manner. In one embodiment, it is removed by slicing off that end part of the tube.

In one embodiment, the sintered shell of the present transfer tube is comprised of a polycrystalline ceramic oxide and at least a detectable amount of an amorphous glassy phase. Generally, the amorphous phase is present in the form of silica, aluminosilicate, sodium aluminosilicate, and mixtures thereof. After the specimen has been metallographically prepared which includes acidetching, the glassy phase is detectable by optical microscopy and by scanning electron microscopy. In this embodiment, the glassy phase in the sintered shell can range from a detectable amount to about 25 weight % of the shell, and frequently, it ranges from about 1 weight % to about 10 weight %, or from about 4 weight % to about 7 weight %, of the shell.

In another embodiment, the sintered shell of the present transfer tube is comprised of polycrystalline alumina, at least a detectable amount of polycrystalline mullite detectable, for example, by standard optical microscopy and at least a detectable amount of a glassy phase. Generally, in this embodiment, the mullite phase ranges from about 1 weight % to less than about 25 weight %, frequently ranging from about 5 weight % to about 20 weight % of the shell. Also, generally, the glassy phase is present in at least a detectable amount, frequently an amount of at least about 1 weight % of the shell.

In yet another embodiment, the sintered shell is comprised of polycrystalline alumina and mullite phases, wherein the mullite content ranges from a detectable amount to about 25 weight % of the shell.

The present transfer tube is an integral body useful for transfer of molten metal, particularly alloys or superalloys. The present transfer tube is particularly useful for transfer of molten metal, alloy or superalloy at a temperature ranging from about 500° C. to less than 1900° C., or from above 1000° C. to less than 1900° C., of from about 1100° C. to about 1800° C., or from about 1300° C. to about 1600° C. Generally, the transfer tube is preheated to a temperature within about 300° C. of that of the molten metal to be passed therethrough. Otherwise, cracking may occur in the high density tube component of the transfer tube. Preheating of the transfer tube can be carried out in a conventional manner such as by means of an external resistance heater or an induction heater.

The present transfer tube has no significant deleterious effect on molten metal, metal alloys or superalloys passed therethrough. It is chemically inert, or substantially chemically inert, with respect to molten metal, metal alloy or superalloy passed therethrough.

Generally, the transfer tube is dimensionally stable, or substantially dimensionally stable, at the temperature of use. Preferably, the low density shell component of the transfer tube does not shrink, or does not shrink to any significant extent, at the temperature of use of the transfer tube.

The present invention permits the direct production of a transfer tube useful for transfer of molten metal. However, if desired, the transfer tube may be machined in a conventional manner to meet required dimensional specifications.

The present transfer tube is particularly useful in the steel industry for the casting of ingots.

The invention is further illustrated by the following examples wherein the procedure was as follows unless otherwise stated:

Processing was carried out at about atmospheric pressure and room temperature unless otherwise noted. By room temperature herein, it is meant from about 15° C. to about 25° C.

All firing and cooling was carried out at about atmospheric pressure.

The fired specimens or transfer tubes were furnacecooled to about room temperature.

Standard techniques were used to characterize the transfer tube.

EXAMPLE 1

A commercially available high density hollow cylindrical tube of polycrystalline alumina was used. The tube had a density of about 99% of theoretical density and an average grain size of about 20 microns. The tube was cylindrical with a cylindrical passageway of the same crosssectional area extending therethrough. The tube had an inner diameter of about 4.8 millimeters, a wall thickness of about 0.76 millimeter, and a length of about 300 millimeters.

To form the slurry, commercially available tabular alumina ($Al_2O_3$) powder, $-325$ mesh size (U.S. screen), i.e. a powder having an average particle size of about 37 microns, was used.

A commercially available latex (Dow Latex 460) wherein the polymer particles comprised about 48% by weight of the latex was used. The polymer particles had a particle size of about 2000 Angstroms and were comprised of butadienestyrene copolymer.

An aqueous alkaline colloidal silica dispersion (NALCOAG®1130) containing colloidal silica, as $SiO_2$, in an amount of 30% by weight of the dispersion, and containing $Na_2O$ in an amount of 0.7% by weight of the dispersion, was used. Specifically, distilled water was added to the commercial dispersion to produce a dispersion wherein the colloidal silica comprised about 15% by weight of the dispersion. The colloidal silica had an average particle size of about 8 microns.

76 weight % of the tabular alumina powder, 2 weight % of the latex, and 22 weight % of the colloidal silica dispersion (15 weight % $SiO_2$) were admixed in a stainless steel vessel to produce a slurry having at about 20° C. a specific gravity of 2.46 g/cc and a viscosity of 12 seconds as measured by a #4 Zahn cup. Specifically, about 90% of the alumina powder was added to a mixture of the latex and colloidal silica dispersion, and mixed for about two hours, then the remainder of the alumina powder was added to the mixture and mixing was continued overnight to produce the slurry.

A polyglycol liquid material, which is a combination of a non-ionic wetting agent and defoamer and sold under the trademark NALC06020, was added to the slurry in an amount of about 20 cc per gallon of slurry. Mixing was then continued for about another 15 minutes.

The slurry had a solids content of about 52% by volume of the total slurry. The solids content in the slurry by weight of the total solids was comprised of about 95% alumina, about 1% polymer, and about 4% silica.

The outer surface wall of the high density tube was sand-blasted at about 20 psi in a conventional manner with alumina powder having an average size of about 200 microns to slightly roughen the surface.

The high density tube was then cleaned in a conventional vapor degreaser containing trichloroethylene vapor. From this point on, the tube was handled with rubber-gloved hands.

The open ends of the tube were plugged with a commercially available solid organic wax (melting point about 70° C.) to prevent coating of the interior of the tube. Specifically, to facilitate dipping and drying on a drying rack, a handling means was formed at one end portion of the high density tube. One end portion of a bar of the wax, about 19 mm in diameter and about 100 mm long, was pushed onto one end portion of the high density tube encapsulating a length of about 95 millimeters of its outer surface wall. A metal eye hook was inserted in the opposite end of the wax bar.

The tube was cleaned again in a conventional manner by immersing it in liquid Freon TF to clean the wax plugs and then it was air dried.

The tube was immersed in the slurry to coat the entire exposed outer surface wall of the tube. Upon withdrawing the coated tube from the slurry, excess slurry was allowed to drain off and the tube was rotated on its long axis to insure a substantially uniform slurry coating on the exposed outer surface wall leaving none of it exposed.

Commercially available coarse alumina powder was gently applied to the wet coating by means of a sand-rain machine to form a substantially uniform coating thereof, i.e. to form substantially a single-grain-thickness layer thereof, on the wet slurry coating leaving no significant portion of the slurry coating exposed. The coarse alumina powder had an average particle size of about 270 microns and was nontabular.

The resulting coated tube was dried in air for about one hour to permit formation of a silica gel which acted as a binder and produced a dimensionally stable coating at room temperature.

The dried, coated tube was then immersed in the slurry to coat the layer of coarse alumina particles. Upon withdrawing the tube from the slurry, excess slurry was again allowed to drain off and the tube was manipulated to insure a substantially uniform slurry coating on the layer of coarse alumina particles leaving no significant portion of the coarse alumina exposed.

The wet coated tube again was inserted in a sand-rain machine containing coarse alumina powder having an average size of about 270 microns to form a substantially uniform coating thereof on the slurry coating leaving no significant portion of the slurry coating exposed.

The resulting coated tube was then again air dried for about one hour to permit formation of a silica gel binder which produced a dimensionally stable coating at room temperature.

This procedure was then repeated five times except using coarser alumina powder and drying time to form the silica gel was about 45 minutes. Specifically, a slurry coating was deposited on the layer of coarse alumina, the wet coated tube was immersed in a fluid bed of coarse alumina powder of average size of about 410 microns to form a coating thereof on the slurry coating, and the resulting coated tube was air dried to form the dimensionally stable silica gel binder.

The resulting dry coated tube was then immersed in the slurry, recovered therefrom to leave a substantially uniform coating of slurry on the layer of coarse alumina powder leaving no significant portion thereof exposed and air dried overnight to form the dimensionally stable silica gel binder.

A number of coated tubes were prepared in this manner.

The coating or shell-forming material deposited on the wax parts was sanded off and a hot soldering tool was used to remove most of the wax plugs and handle.

For the initial firing, a gas-fired furnace was used. The firing atmosphere was an oxidizing atmosphere comprised of natural gas and more than about 50% by volume of air.

The coated tubes were placed in the furnace at room temperature. The furnace was allowed to reach 1000° C. at its own rate which was after one hour.

The tubes were kept at 1000° C. for one hour. The furnace was then turned off, and the pieces were allowed to furnace cool to room temperature.

The resulting sintered coated tubes were free of wax and appeared to be free of elemental carbon. Each high density tube had a multi-layered sintered shell directly bonded to its outer surface wall. The shell was comprised of sequential layers directly bonded to each other comprised of eight primary layers and seven intermediate secondary layers. To form the sintered shell, the dried coatings had undergone less than 1% linear shrinkage during the 1000° C. exposure. Porosity in the shell was interconnecting. The shell had a total thickness of about 6 mm. The shell appeared to be free of cracks.

The outer surface wall of each shell was machined in a conventional manner reducing its thickness by about 0.5 to 0.75 mm to permit the fitting in the boron nitride sleeve in Examples 3 and 4. Each machined specimen was then sliced cross-sectionally with a diamond cut-off wheel producing a number of the present transfer tubes. Each transfer tube was about 38 mm long.

Each resulting transfer tube was comprised of the high density tube with the low density shell directly bonded to its outer surface wall leaving none of the outer surface wall exposed. Both end surfaces of the high density tube were free of shell material. From other work, it was known that the sintered shell was comprised of polycrystalline alumina, and a glassy phase. From other work, it was estimated that at least about 75 weight % of the polycrystalline phase was comprised of alumina and about 5% by weight of the shell was comprised of glassy phase.

The transfer tubes produced in this example would be useful for the transfer of molten metal.

EXAMPLE 2

A few of the transfer tubes produced in Example 1 were sintered to make them dimensionally stable at temperatures higher than 1000° C.

Specifically, the transfer tubes were placed in a resistance furnace with molybdenum heaters and sintered in an atmosphere of helium at about 1600° C. for about one hour and then furnace cooled to room temperature.

Examination of one of the resulting transfer tubes showed that, compared to the shell thickness just before firing at 1600° C., the shell had undergone about 0.5 percent radial shrinkage but essentially no longitudinal shrinkage. The shell appeared crack free.

One of the transfer tubes was cut to produce a cross section thereof about 1 centimeter long which was used to determine the density of the shell which was about 76 percent. The porosity in the shell was interconnecting.

The transfer tubes produced in this example would be useful for transfer of molten metal.

EXAMPLE 3

A boron nitride support sleeve was used which was open at both ends, which had an inner diameter of 12.8 mm and a wall thickness of 2.5 mm.

One of the transfer tubes produced in Example 2 was placed in the boron nitride support sleeve. At room temperature there was a gap of about 0.15 mm between the transfer tube and the sleeve and it was predetermined that at 1600° C. the gap would be zero.

Molten Rene 95, which was at 1600° C., was passed through the transfer tube for about 3 minutes. The liquid metal was caught in a crucible where it solidified into an ingot.

Examination of the transfer tube showed that cracking had occurred in the high density tube component but the part remained intact.

EXAMPLE 4

One of the transfer tubes produced in Example 2 was placed in a boron nitride support sleeve, according to the disclosure of Example 3. A molybdenum wire wound oven was placed around the assembly to heat the transfer tube to a temperature within 300° C. of the pour temperature of 1600° C.

Molten Rene 95, which was at 1600° C., was passed through the heated tube for about 3 minutes. The liquid metal was caught in a crucible where it solidified into an ingot.

Examination of the transfer tube showed that the molten metal had no deleterious effect on it. No cracks were visible in the high density tube component.

What is claimed is:

1. A transfer tube useful for transfer of molten metal comprised of a hollow high density tube having directly bonded only to its outer surface wall leaving no significant portion thereof exposed a continuous low density shell, said high density tube being comprised of polycrystalline ceramic oxide with a density of at least about 90% of its theoretical density, said high density tube having a passageway extending through its length with a cross-sectional area at least sufficient for transfer of molten metal therethrough, said shell being comprised of ceramic oxide with at least about 75 weight % of said shell being polycrystalline, said shell being comprised of a plurality of sequential layers directly bonded to each other, said sequential layers being comprised of at least two primary layers and at least one intermediate secondary layer disposed between said primary layers, the ceramic oxide grains in said primary layers having an average size which is significantly smaller than the average size of the ceramic oxide grains in said intermediate secondary layer, said low density shell ranging in density from about 40% to about 80% of its theoretical density, said low density shell having a thermal expansion coefficient within about ±25% of the thermal expansion coefficient of said high density tube, said low density shell having a thermal conductivity ranging from about 10% to about 90% lower than that of said high density tube.

2. The transfer tube according to claim 1, wherein said shell contains more than two of said primary layers and contains a plurality of said intermediate secondary layers.

3. The transfer tube according to claim 1, wherein said high density tube is comprised of ceramic oxide material selected from the group consisting of alumina, beryllia, magnesia, magnesium aluminate, mullite, yttria, zirconia, and mixtures thereof.

4. The transfer tube according to claim 1, wherein the polycrystalline phase of said shell is comprised of ceramic oxide material selected from the group consisting of alumina, beryllia, magnesia, magnesium aluminate, mullite, yttria, zirconia, and mixtures thereof.

5. The transfer tube according to claim 1, wherein said high density tube is comprised of alumina and the polycrystalline phase of said shell is alumina.

6. The transfer tube according to claim 1, wherein said shell has a density ranging from about 50% to about 70%.

7. The transfer tube according to claim 1, wherein said high density tube has a minimum wall thickness of about 0.125 millimeters.

8. The transfer tube according to claim 1, wherein said high density tube is comprised of alumina and said shell is comprised of alumina, mullite, and amorphous glassy phase.

9. The transfer tube according to claim 1, wherein said high density tube and passageway are substantially cylindrical.

10. The transfer tube according to claim 1, wherein said shell has a thermal expansion coefficient which is substantially the same as that of the high density tube.

11. A transfer tube useful for transfer of molten metal comprised of a hollow high density tube having directly bonded only to its outer surface wall, leaving no significant portion thereof exposed, a continuous low density ceramic oxide shell, said high density tube being comprised of polycrystalline alumina with a density ranging from about 95% to about 99% of its theoretical density, said high density tube having a passageway extending through its length with a crosssectional area at least sufficient for transfer of molten metal therethrough, at least about 85 weight % of said shell being comprised of polycrystalline alumina, said shell being comprised of a plurality of sequential layers directly bonded to each other, said sequential layers being comprised of at least two primary layers and at least one intermediate secondary layer disposed between said primary layers, the alumina grains in said primary layers having an average size which is significantly smaller than the average size of the alumina grains in said intermediate secondary layer, said low density shell ranging in density from about 50% to about 70% of its theoretical density, said low density shell having a thermal conductivity ranging from about 10% to about 90% lower than that of said high density tube.

12. The transfer tube according to claim 11, wherein said shell leaves none of said outer surface wall of said high density tube exposed.

13. The transfer tube according to claim 11, wherein said transfer tube, said passageway and said shell are substantially cylindrical.

14. The transfer tube according to claim 11, wherein said shell is comprised of alumina and at least a detectable amount of glassy phase.

15. The transfer tube according to claim 11, wherein said shell is comprised of alumina, at least a detectable amount of mullite and at least a detectable amount of glassy phase.

16. The transfer tube according to claim 11, wherein said shell is comprised of alumina and at least a detectable amount of mullite.

17. The transfer tube according to claim 11, wherein said shell is comprised of alumina.

* * * * *